United States Patent [19]

Palmer

[11] 4,113,043
[45] Sep. 12, 1978

[54] APPARATUS FOR DRIVING WHEELED VEHICLES

[76] Inventor: Jack P. Palmer, 509 1/2 Paden St., Endicott, N.Y. 13760

[21] Appl. No.: 721,154

[22] Filed: Sep. 7, 1976

Related U.S. Application Data

[63] This application is a continuation of Ser. No. 453,554, filed Mar. 21, 1974, abandoned.

[51] Int. Cl.² .................... B60K 5/12; B60K 17/30
[52] U.S. Cl. ................... 180/33 A; 180/33 D;
180/34; 180/31; 224/39; 248/218.4; 280/289 R
[58] Field of Search ............... 180/33 D, 26 R, 26 A, 180/31, 34, 33 C, 33 A, 74, 65 A, 65 R, 68.5; 280/289 R, 289 H, 289 A; 224/30 R, 30 A, 31, 32, 33, 34, 35, 36, 37, 38, 39, 40, 41, 42; 248/218.4, 219.1

[56] References Cited

U.S. PATENT DOCUMENTS

| 627,066 | 6/1899 | Schnepf | 180/34 |
|---|---|---|---|
| 1,485,067 | 2/1924 | Bristol | 224/30 R |
| 3,110,507 | 11/1963 | Riner | 180/68.5 X |
| 3,431,994 | 3/1969 | Wood | 180/31 |
| 3,759,339 | 9/1973 | Farrow | 180/65 A |
| 3,827,519 | 8/1974 | Snider | 180/65 A |

FOREIGN PATENT DOCUMENTS

| 267,224 | 3/1965 | Australia | 224/35 |
|---|---|---|---|
| 53,604 | 9/1937 | Denmark | 180/33 D |
| 805,974 | 12/1936 | France | 224/39 R |
| 993,378 | 10/1951 | France | 180/31 |
| 379,324 | 3/1940 | Italy | 180/34 |
| 72,385 | 12/1952 | Netherlands | 180/31 |
| 215,270 | 10/1941 | Switzerland | 280/289 H |
| 443,948 | 2/1968 | Switzerland | 180/34 |
| 15,030 of | 1913 | United Kingdom | 224/39 R |
| 654,325 | 6/1951 | United Kingdom | 180/33 D |

*Primary Examiner*—John P. Silverstrim
*Attorney, Agent, or Firm*—George E. Clark

[57] ABSTRACT

A two or more wheeled vehicle is driven by a DC electric motor having its output shaft connected to a frictional drive member which bears on the circumference of a driven wheel. The drive motor is face or flange mounted on mounting bracket which is constructed of a metal stamping or an integral combination of two stampings. The mounting bracket may take any one of several forms, depending upon whether or not it is desired to hold the power source in addition to the drive motor. In one form, the mounting bracket is adapted to hold a source of power for the motor such as a storage battery. The drive mechanism is adapted to permit the vehicle to be either motor driven or human driven or both in combination. The mounting of the drive mechanism requires no modifications to the vehicle frame and uses the caliper brake bolt as a precise locator to insure universal adaptability of the drive mechanism to any vehicle having such a caliper brake bolt.

5 Claims, 17 Drawing Figures

APPARATUS FOR DRIVING WHEELED VEHICLES

This is a continuation, of application Ser. No. 453,554 filed Mar. 21, 1974 now abandoned.

BACKGROUND OF THE INVENTION

The present invention relates to a drive assembly for propelling wheeled vehicles, and more particularly to an electrically operated drive assembly for vehicles having two or more wheels.

In the prior art, there are various systems for propelling two or more wheeled vehicles such as internal combustion engines, driving a front or rear wheel, or systems using electric motors to drive front or rear wheels of vehicles through complex gearing and clutching mechanisms. With the current emphasis on conservation of petroleum resources, noise abatement, and reduction of environmental pollution, internal combustion engines are not favored as means for driving small vehicles such as bicycles, tricycles and the like.

The prior art electrically driven vehicles are generally of a type which require a very complex arrangement of components, gears and clutches to drive the vehicle.

SUMMARY OF THE INVENTION

Accordingly, it is a primary object of the present invention to drive a two or more wheeled vehicle with a simple drive assembly employing a single DC electric motor.

It is another object of the present invention to drive a two or more wheeled vehicle with a single DC electric motor having an output shaft connected to a friction drive wheel which is maintained in contact with the circumference of a wheel of the vehicle to be driven, in which the motor and friction drive wheel are precisely located by a motor mounting bracket having a fixed reference point on the vehicle frame.

It is still further object of the present invention to drive a two or more wheeled vehicle by a single DC electric motor where the motor mounting bracket is located by a caliper brake bolt mounted on the vehicle frame.

It is a still further object of the present invention to drive a tricycle front wheel or a bicycle front or rear wheel with a single DC electric motor mounted by a universal motor mounting bracket constructed of a single stamping or integral combination of two stampings and adapted to mount both the motor and a DC power source for the motor such as a storage battery.

It is another object of the present invention to drive the steering wheel of a three wheeled vehicle with a single DC electric motor mounted by a motor mounting bracket constructed of a single stamping or integral combination of two stampings and adapted to mount both the DC electric motor and a DC power source for the motor.

Yet another object of the present invention is to drive the front or steering wheel of a three wheeled vehicle with a single electric motor mounted on a motor mounting bracket located by a caliper brake bolt to the frame of the vehicle.

Still another object of the present invention is to support a power source for the electric motor by a device which may be mounted in any of several positions in a cycle frame.

It is a feature of the present invention that the rider of the vehicle may choose between electrically driven drive of the vehicle or human powered drive of the vehicle or both in combination with no modification to the frame of the vehicle.

It is another feature of the present invention in one embodiment that due to the constant frictional contact between the driven wheel and the driving wheel attached to the output shaft of the motor, the motor can be used as a dynamic braking force when the vehicle is descending hills.

Other objects, features and advantages of the present invention will become apparent to one skilled in the art from the following detailed description of the invention.

DESCRIPTION OF PREFERRED EMBODIMENTS OF THE INVENTION

Figure 1:
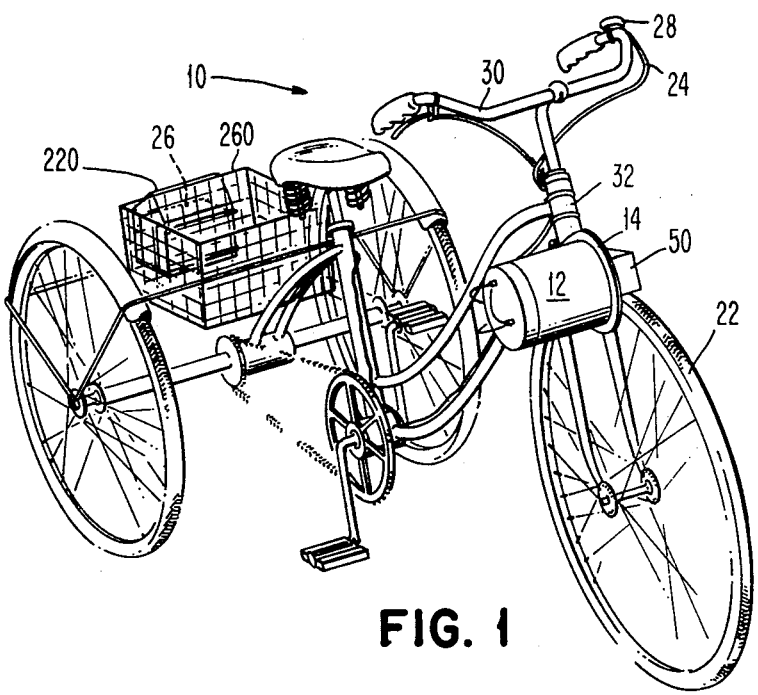
FIG. 1 is an isometric view of a three wheeled vehicle equipped with drive mechanism according to a preferred embodiment of the present invention.
Figure 2:
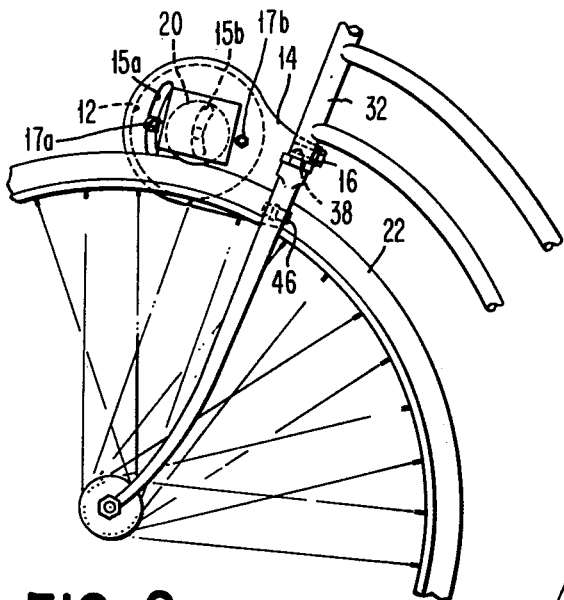
FIG. 2 is a side view of a bicycle showing the drive mechanism of FIG. 1 and its relation to the driven wheel and the frame of the bicycle.
Figure 3:
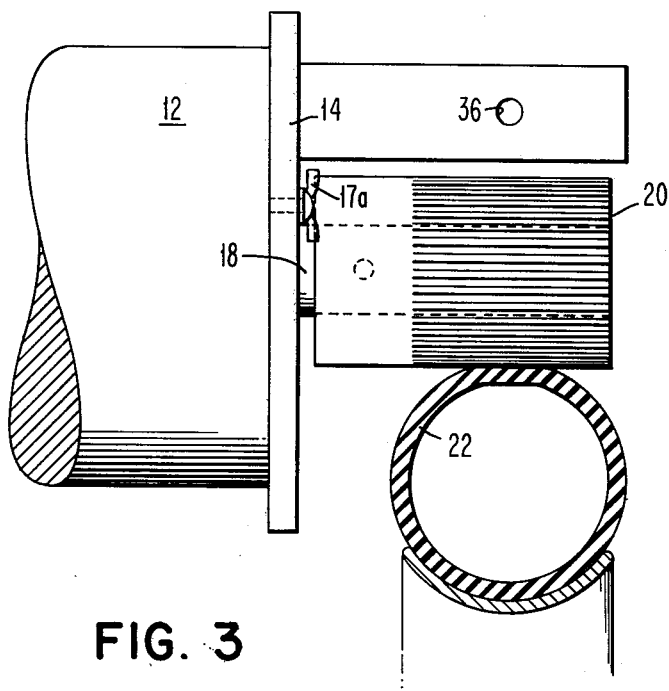
FIG. 3 is a cross section view of the drive mechanism of FIG. 1 showing the frictional drive wheel and the driven wheel.

Referring now to FIGS. 1, 2 and 3 a tricycle 10 employing the present invention is shown. Electric motor 12 is mounted on mounting bracket 14 which is located by caliper brake bolt 16. The output shaft 18 of motor 12 is connected to friction drive wheel 20 which bears against the surface of tire 22 of tricycle 10. Slots 15a, b in mounting bracket 14 permit the contact pressure between friction driving wheel 20 and tire 22 to be adjusted. Slots 15a, b are long enough to permit the drive mechanism to be rotated so that drive wheel 20 does not contact the tire 22. Motor mounting wing nut 17a is used to adjust drive wheel 20 to proper contact between the friction drive wheel 20 and bicycle tire 22.

Figure 6A:
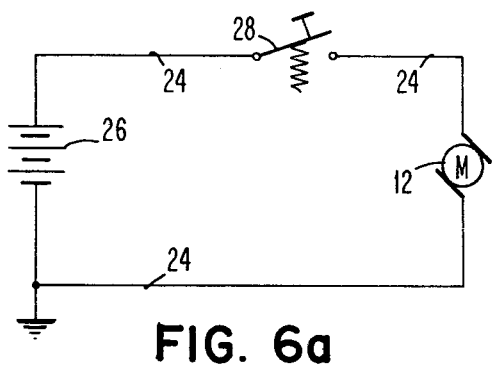
FIG. 6A is a diagram of a simplified electrical circuit for a drive mechanism according to the present invention.

Referring now also to FIG. 6A, motor 12 is connected by wires 24 in a series electrical circuit to power source 26 such as a storage battery and to a momentary contact switch 28 mounted on the handle bars 30 so that the operator may energize of de-energize motor 12 at his option.

Referring now to FIGS. 2 and 3, the details of the drive mechanism according to the present invention as embodied in this first embodiment will be described. Mounting bracket 14 is located in relation to vehicle frame 32 by caliper brake bolt 16 which passes through hole 36 in the mounting bracket and brake bolt hole 38 in the vehicle frame. Motor 12 is secured by nuts 17a and 17b in slot 15a and hole 15c respectively on said mounting bracket which allows the motor to be moved along an arc described by the slots to permit frictional drive wheel 20 to be adjusted in frictional contact with cycle tire 22.

Frictional drive wheel 20 may be knurled as shown in FIG. 3 to improve the friction between drive wheel 20 and tire 22.

Figure 14:
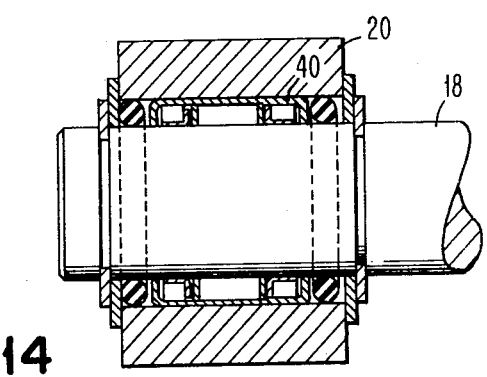
FIG. 14 is a sectional view of a frictional drive wheel according to the present invention including an over running clutch mechanism.

Referring to FIG. 14, the drive wheel 20 may also include an over running clutch 40 such as the commercially available Torrington Company drawn cup over running roller clutch Model RC running on motor shaft 18.

The use of an over running clutch allows the electric motor to be of a smaller physical size having a higher output speed to achieve a given output power, the resulting higher motor speed is then coupled with a smaller diameter driving wheel thereby effecting economy of cost, size and weight.

In sectional view FIG. 3, it is seen that frictional drive wheel 20 engages and slightly depresses the outer circumference of cycle tire 22 to provide a frictional drive.

The friction between drive wheel 20 and cycle tire 22 is adjusted to create a force just sufficient to drive the cycle with the operator aboard while not being so large as to waste energy in overly deforming the tire. The operator can then pedal, use power or both.

Figure 4:
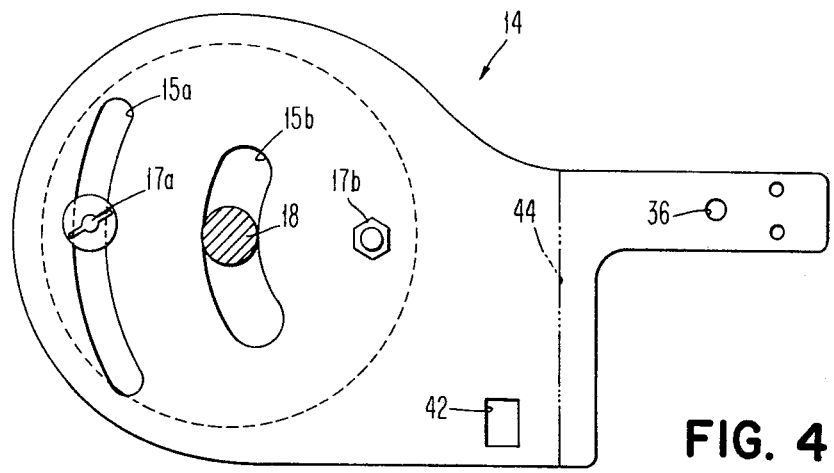
FIG. 4 is a plan view of a mounting bracket stamping to be used with a preferred embodiment of the present invention.

FIG. 4 shows a single piece stamping used to construct the motor mounting bracket 14 as described above. For additional rigidity, a clamp 46 (see FIG. 5) may be used to further affix the bracket through slot 42 to a frame member 32.

Since bracket 14 is a single piece stamping, it can be made much less expensively than the more complex mounting brackets used by prior art devices. The only forming operation required is a single bend along the line 44 shown in FIG. 4.

Figure 5A:
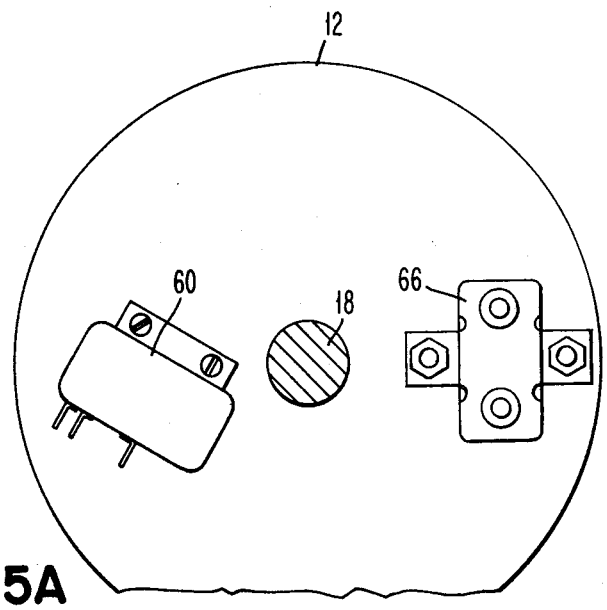
FIG. 5A is an end view of an electric motor which may be used with embodiments of the present invention showing mounting of relay and circuit breaker under a cover for safety and weather protection.
Figure 5:
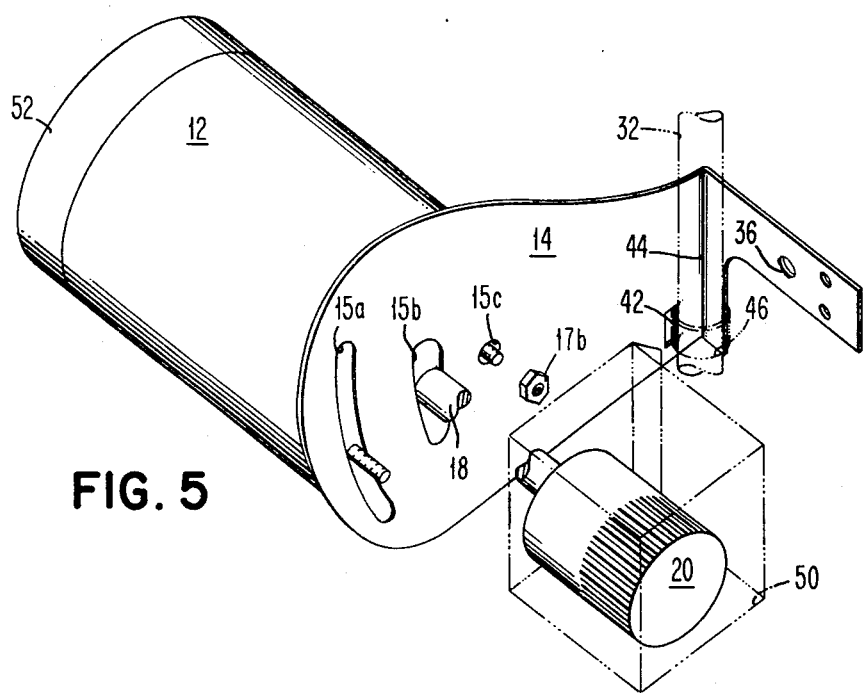
FIG. 5 is an isometric view of a motor mounting bracket according to a preferred embodiment of the present invention further showing an electric motor frictional drive wheel and splash cover.

FIG. 5 is an isometric view of a motor mounting bracket made from the stamping as shown in FIG. 4 and including the positioning of the electric motor 12, the frictional drive wheel 20 and a splash cover 50.

Splash cover 50 is used with either front or rear wheel drive to inhibit debris and splash throw off from drive wheel 20 and for operator safety. Additionally, cover 50 is used with rear wheel drive to prevent accumulation of road mud and other debris from being thown against and clogging the caliper brake mechanism.

Referring again to FIG. 6A and 6B, the electrical circuit used with the present invention will be described. Battery 26 is connected through push button switch 28 to motor 12 by lines 24 in the simplified circuit of FIG. 6A.

Figure 6B:
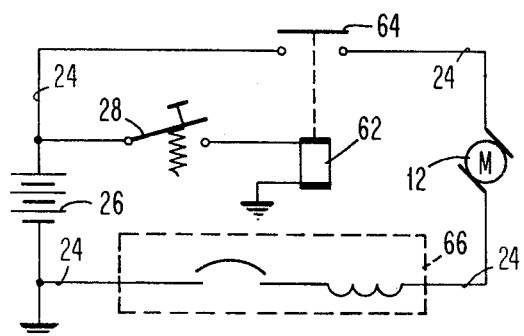
FIG. 6B is a diagram of a second embodiment of an electrical circuit for use with embodiments of the present invention.

The circuit diagram shown in FIG. 6B is a further embodiment including overload protection and relay control of the motor armature current. Power source 26 is connected to push button switch 28 which controls application of power to relay coil 62. Upon actuation of relay 62, relay contact 64 closes completing the power circuit from power source 26 to motor 12. In the embodiment of FIG. 6B, the power circuit is completed through a circuit breaker 66 which protects motor 12, wires 24 and power source 26 from overload conditions.

Referring again to FIGS. 5 and 5A, the location of the power control components shown in FIG. 6B will be described.

In FIG. 5, motor 12 has a cover 52 which shields the wire terminals and protects the outboard end of motor 12 under cover 52 shown in FIG. 5, as those types of components in general require weather protection.

Figure 8:
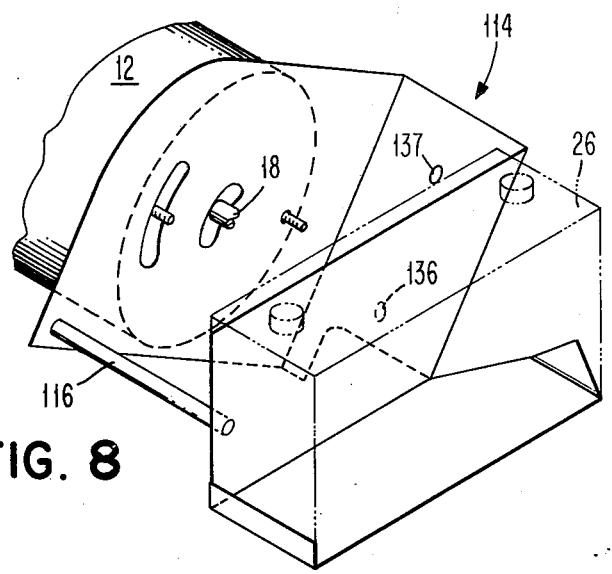
FIG. 8 is an isometric view of a bracket formed from the stamping shown in FIG. 7.
Figure 7:
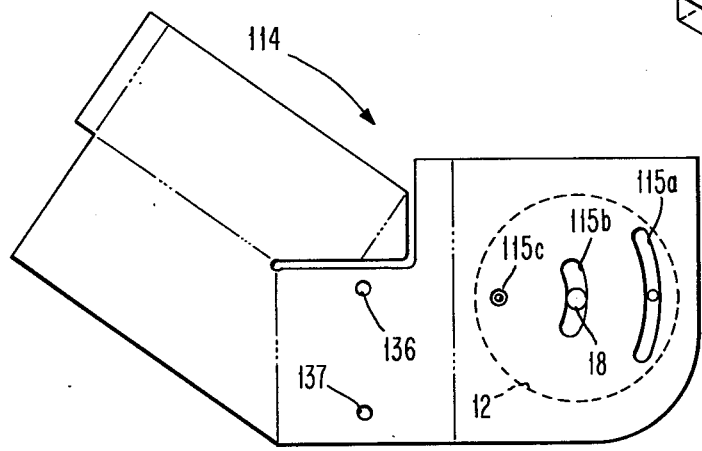
FIG. 7 is a plan view of a second embodiment of a single stamping for a mounting bracket which may be used with the present invention.

Referring now to FIGS. 7 and 8, a mounting bracket 114 is shown first in FIG. 7 as a single integral stamping and in FIG. 8 as an isometric view showing how the motor 12 and power source 26 would be mounted in a single bracket.

FIG. 7 shows bracket 114 complete with motor mounting hole 115c and slots 115b and 115a, as well as locating hole 136 and stabilizing bolt hole 137. In addition to the locating holes and the battery support, FIG. 8 also shows a brace member 116 which is connected between side plates of bracket 114 to strengthen the bracket assembly. Bracket 114 is used with rear bicycle drive such as shown in FIG. 10.

Figure 9:
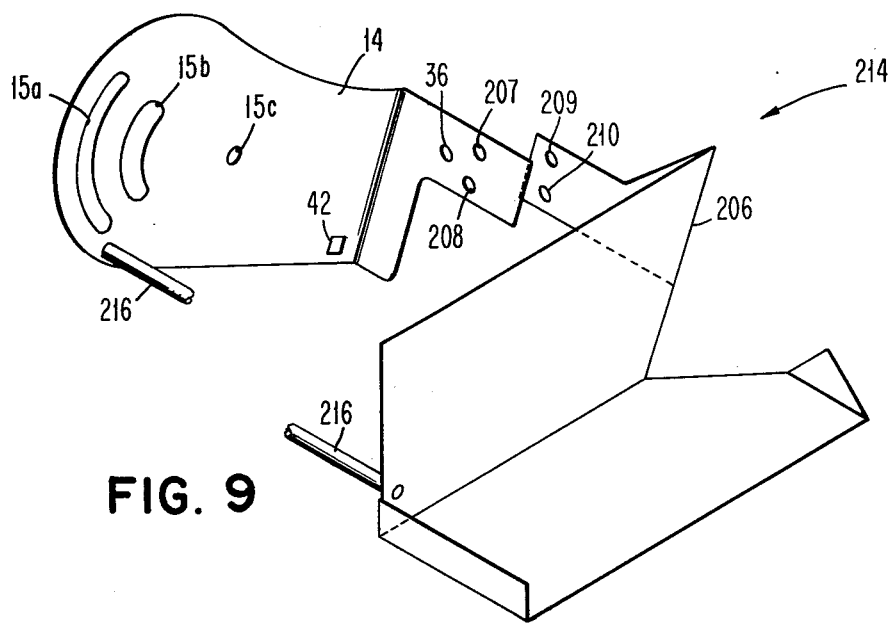
FIG. 9 is an isometric view of the integral combination of two stampings to be used with embodiments of the present invention.

Referring now to FIG. 9, a third embodiment of a mounting bracket 214 is shown in which the universal bracket 14 has two additional holes 207 and 208 in the panhandle portion to attach to battery holder 206 by passing fasteners through holes 207 and 209 and 208 and 210 respectively. A horizontal support 216 similar to brace 116 may be used to strengthen bracket 214 where necessary. The two piece stamping, which is usable for either front or rear wheel drive, provides an inexpensive and compact bracket for supporting a drive mechanism and power source according to the present invention.

Figure 10:
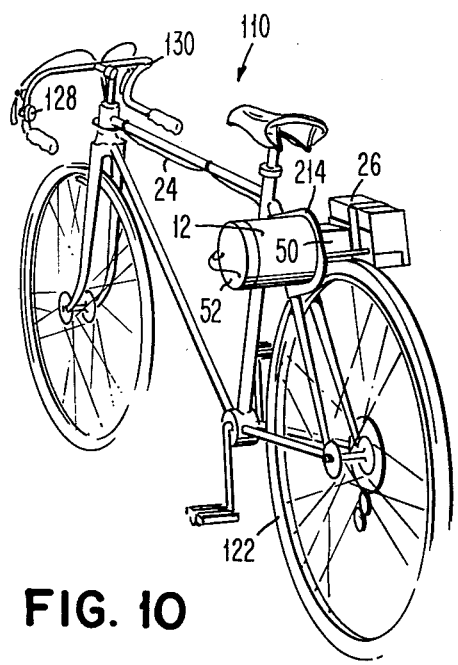
FIG. 10 is an isometric view of the drive mechanism embodying the present invention mounted to drive a rear wheel such as for a bicycle.

Referring now to FIG. 10, a second embodiment of the present invention is shown whereby the drive mechanism is used to drive the rear wheel of a bicycle.

Bracket 214 shown in FIG. 9 is again used for this embodiment, bracket 214 being a universal mounting bracket for the drive mechanism of the present invention.

Bicycle 110 has mounted thereon bracket 214 which is located by the rear caliper brake mounting hole 138 (see FIG. 11) in the bicycle frame 132.

In FIG. 10, splash cover 50 obscures the view of frictional drive wheel 20.

Figure 11:
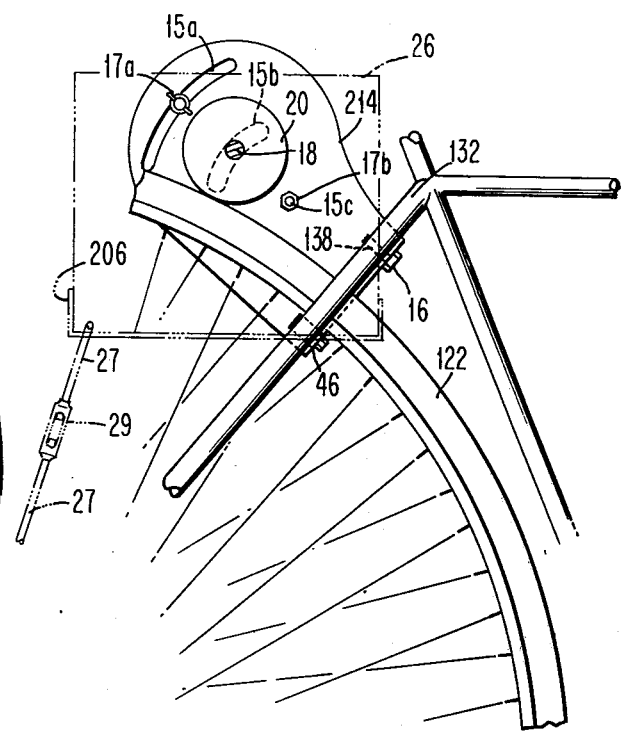
FIG. 11 is a side view showing the mounting of the drive mechanism according to the present invention for the embodiment shown in FIG. 10.

However, FIG. 11 shows a side view of the rear mounted drive mechanism according to the second embodiment of the present invention showing bracket 214, substantially the same as in FIG. 2 since the drive mechanism is universal in character.

A vertical support member 27 may be required with the embodiment shown in FIG. 10 to support the weight of battery 26. This support member 27 may be adjustable in length to accommodate various size cycles. An adjustable turn buckle 29 is used to set the proper length of support 27. Support 27 is attached to a fender mounting hole on frame member 132 at the lower end thereof and to a hole in bracket 206 as shown in FIG. 11.

Figure 13:
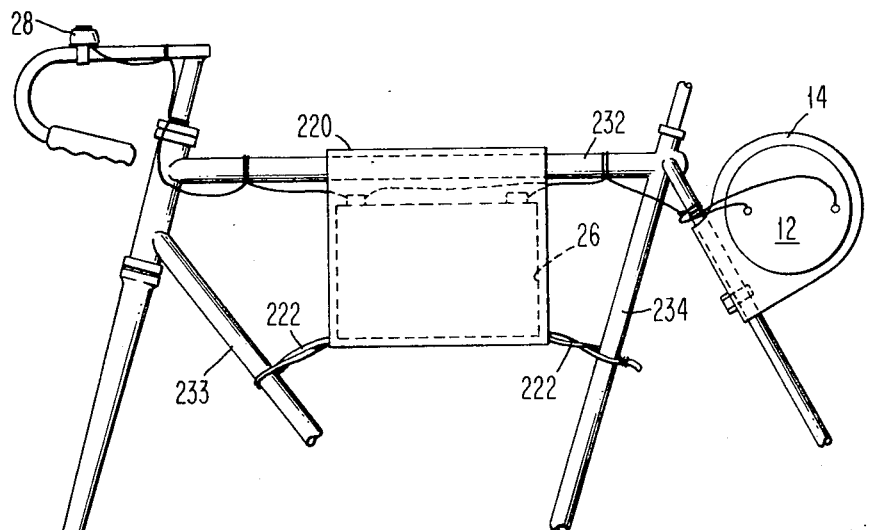
FIG. 13 is a side view of a bicycle showing the placement of the battery holder shown in FIG. 12.
Figure 12:
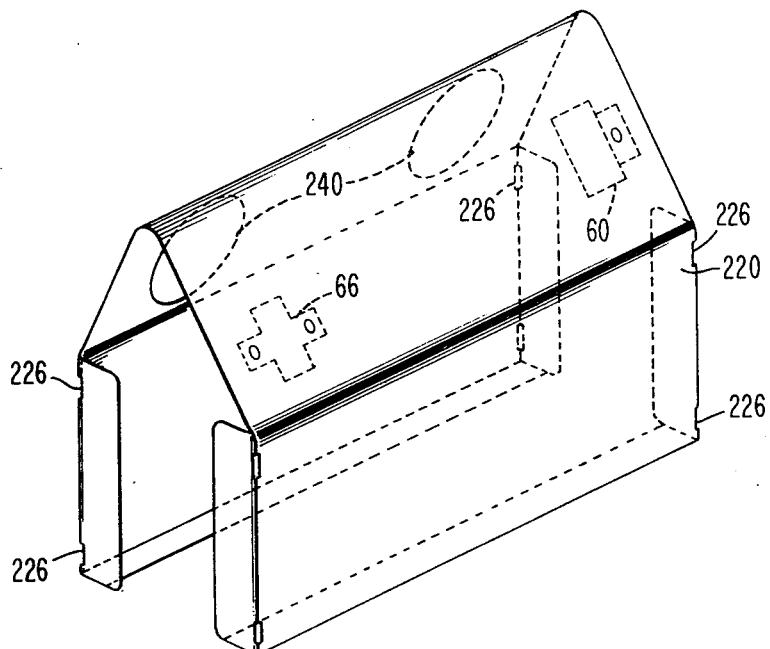
FIG. 12 is an isometric view of a battery holder for use with embodiments of the present invention.

Referring now to FIGS. 12 and 13, an embodiment of the present invention is shown wherein the power source such as storage battery 26 is supported by a preformed battery holder 220 which may be formed from a plastic or metal material and suspended from bicycle frame member 232 which passes through the peaked portion of the battery holder 220 to support the weight of battery 26. The bottom corners of battery holder 220 are fixed mounted by ties 222 to bicycle frame members 233 and 234 respectively to inhibit swinging and to provide vertical, lateral and longitudinal support.

Battery holder 220 may be formed from a metal stamping or from plastic. Holes 240 allow battery 26 to be checked and filled without disassembling the battery from holder 220. In addition to supporting battery 26, holder 220 also protects the operator from battery acid. Further, since holder 220 allows battery 26 to be mounted in a position having a relatively low center of gravity, the static and dynamic stability of the cycle is enhanced.

It has been found in testing that a battery holder such as 220 mounted on the frame member 232 of a bicycle does not interfere with the operator's leg motion and provides a simple and efficient battery carrier.

Figure 15:
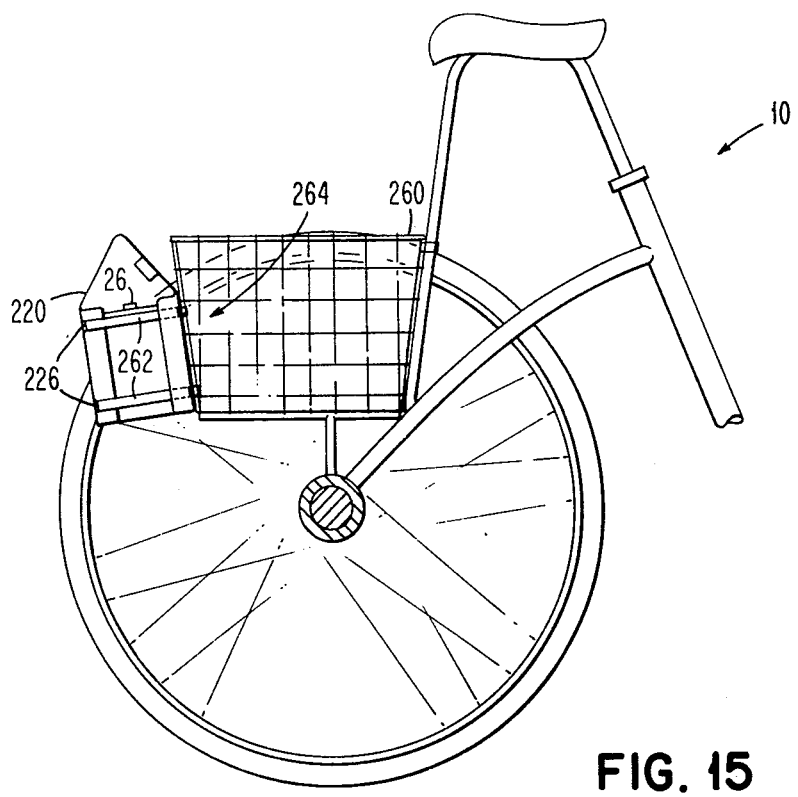
FIG. 15 is a view of a tricycle showing the mounting of the universal battery holder, shown in FIG. 12, on the rear of a carrier basket.

An alternate mounting for holder 220 is shown in FIG. 15 for a tricycle having a rear mounted basket.

Battery holder 220 is attached to rear mounted carrier basket 260 by attachment ties 262 which pass through slots 226 in holder 220 and the rear portion 264 of basket 260.

The embodiments of the present invention described above present several alternatives to gasoline powered internal combustion engine vehicles. Although the primary intention of embodiments of the present invention is for relatively slow speed (in the order of 15 miles per hour) travel, to maximize range, higher speeds can be obtained at a sacrifice of range of travel using other combinations of motor speed, horsepower and frictional drive wheel diameters.

The cycle drive mechanism according to the present invention provides a universal means of driving any cycle having a caliper brake system.

While it will be apparent to those skilled in the art that the embodiments of the present invention disclosed fulfill the objects of the present invention, it will be appreciated that the invention is susceptible to modification, variation and change.

What is claimed is:

1. A mounting bracket for mounting a drive assembly for driving a cycle having at least two wheels comprising a substantially flat plate having a single bend therein, which bend separates said flat plate into first and second surfaces;
    a first mounting hole on said first surface of said plate and a second mounting hole on said second surface of said plate for attaching said mounting bracket to said cycle to be driven; and
    first and second slots in said first surface of said plate for slideably mounting a motor for driving said cycle.

2. A mounting bracket according to claim 1, wherein said first and second slots may form first and second arcs respectively to allow said motor to be rotated about a common point to respectively engage a tread surface of a tire of a cycle to be driven or be disengaged from said tread surface.

3. A mounting bracket according to claim 1 further comprising third and fourth mounting holes on said second surface for attaching a battery carrier to said mounting bracket.

4. A mounting bracket according to claim 1, further comprising a shield for preventing road dirt, mud and other debris from striking an operator of said cycle.

5. A mounting bracket according to claim 1, wherein said second surface is cut to adapt to a contour of said cycle to be driven.

* * * * *